Figure 1:
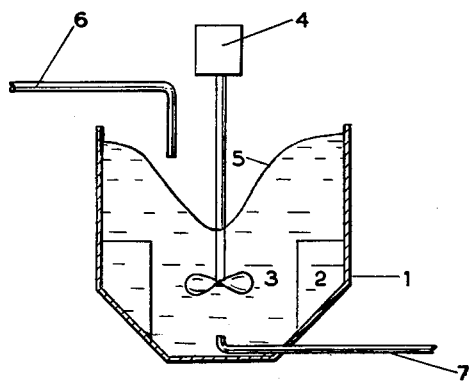

June 9, 1964

D. I. LEGGE ETAL 3,136,605

METHOD FOR REACTING GASES WITH LIQUID SOLUTIONS
OR SOLIDS SUSPENDED IN LIQUIDS

Filed Aug. 3, 1959

INVENTORS
Denis Ivor Legge, and
Alan Francois Leger

By
Watson, Cole, Grindle & Watson
ATTORNEYS

United States Patent Office 3,136,605
Patented June 9, 1964

3,136,605
METHOD FOR REACTING GASES WITH LIQUID SOLUTIONS OR SOLIDS SUSPENDED IN LIQUIDS
Denis Ivor Legge and Alan Francois Leger, Johannesburg, Transvaal, Republic of South Africa, assignors to Anglo-Transvaal Consolidated Investment Company Limited, Johannesburg, Transvaal, Republic of South Africa
Filed Aug. 3, 1959, Ser. No. 831,394
9 Claims. (Cl. 23—168)

This invention relates to a method whereby chemical reactions may be effected between gases and liquids or between gases and solids dissolved or suspended in liquids and is particularly applicable to auto-oxidation reactions utilising air as the oxidant.

An example of such a commercial auto-oxidation reaction from which in practice satisfactory results have not been obtained is the reaction of uranium plant barren solutions with sulphur dioxide and air to produce dilute sulphuric acid. This process was carried out in a series of columns or the like the reaction depending largely on the dissemination of air in the columns through fine diffusers so as to oxidise the sulphur dioxide introduced into the barren solutions.

It has now been found that this process for the production of sulphuric acid can be effectively carried out by stirring the barren solution or water in a reaction vessel at such a rate that a vortex is formed, and discharging sulphur dioxide downwardly into the vortex so that together with air it is drawn into the liquid in which it is entrained in the form of small bubbles resulting in sulphuric acid being formed by the reaction of the gaseous and liquid reactants. It has furthermore been found that this process is also generally applicable to the reaction of gases with liquids or with solids dissolved or suspended in liquids, it being understood that the term gases is limited to those gases which will normally react with the relevant liquids or solids in solution or suspension.

In accordance with this invention therefore there is provided a method of reacting gases with a liquid or solids admixed with or dissolved or suspended in a liquid in which the liquid is stirred at a rate sufficient to produce a vortex and the gas is caused to flow through the vortex.

In the example referred to above for the production of sulphuric acid the reaction may be carried out at any suitable temperature. The stirrer should be of a propeller type having a blade with an inclined edge which acts to beat the gases into the solution so that they are finely dispersed into small bubbles by the action of the stirrer. A surface active agent may be added if desired to give further control of bubble size. It has been found also that there is a direct relationship between the reaction rate and speed of agitation or power consumption of the stirrer mechanism for any fixed quiescent or agitated level in the solution. Suitable equipment commercially available for carrying out the reaction is a "Fagergren" flotation unit. The reaction rate may also be increased by introducing a proportion, up to about 25%, of the gaseous reactants into the bottom of the reaction vessel by a supercharging operation. It will also be clear that the process may be carried out either as a batch or continuous process.

Figure 2:
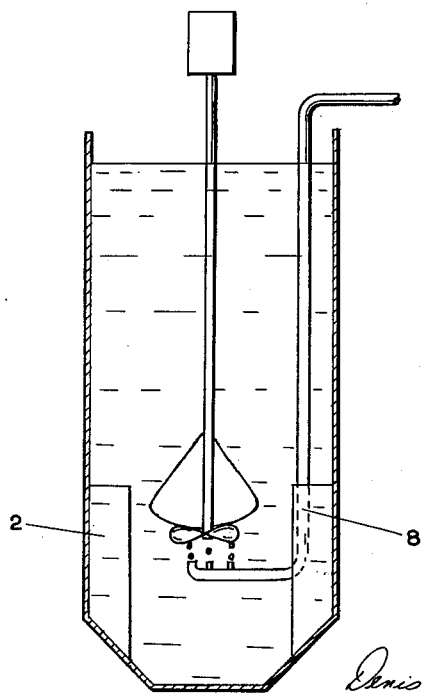

Elementary types of stirred reaction vessels are illustrated in the accompanying drawings in which:

FIG. 1 illustrates a shallow reaction vessel having top and bottom gas inlets, and FIG. 2 illustrates a deep reaction vessel having only a bottom gas inlet.

As shown in FIG. 1, there is provided a shallow vessel 1 fitted with baffles 2, and a stirrer 3 driven by motor 4. When the stirrer is operated with the vessel containing liquids, solutions, suspensions or slurries a vortex 5 is formed through which both atmospheric air is drawn and any gas or mixture of gases discharged into the vicinity of vortex 5 through the outlet of pipe 6. Further gaseous material may be discharged at superatmospheric pressure through the bottom inlet pipe 7. This will produce a submerged form of vortex of a type more clearly illustrated in FIG. 2.

As shown in FIG. 2 the reaction vessel 1 is relatively deep with the stirrer 3 located towards the bottom thereof. The gaseous reactant is led in under the stirrer 3 through a pipe 8 and due to the action of the stirrer forms a submerged vortex.

The following is an example showing the commercial application of the invention to the production or increase of the ferric sulphate content of uranium plant pregnant or barren solutions in which ferric sulphate is utilised as the oxidising agent and becomes thereby converted to ferrous sulphate. In this application the solution is treated with sulphur dioxide and air in a stirred reactor.

*Example I*

An aqueous uranium plant feed solution containing essentially ferrous sulphate, ferric sulphate and sulphuric acid was treated continuously in a "Fagergren" flotation unit of the type illustrated in FIG. 1, but having 17 stirrers each run at 600 r.p.m. by a separate 15 H.P. motor. The solution flow rate through the reaction vessel was 200 gallons per minute and the gas flow rate unknown. The gas was atmospheric air plus 7% by volume of $SO_2$ fed into the vortex by a top feed pipe at 1830 cubic feet per minute at 90° C. and 640 mm. Hg pressure.

The ferrous iron, ferric iron and sulphuric acid content of the feed and product solutions expressed in grams per litre was as follows:

|  | Feed solution | Product solution |
| --- | --- | --- |
| Ferrous iron | 9.2 | 0.4 |
| Ferric iron | 4.3 | 13.1 |
| $H_2SO_4$ | 12.5 | 15.7 |

The production rates were 60 pounds of ferric iron per hour per stirrer and 22 pounds of sulphuric acid per hour per stirrer.

The reaction according to the above example may be regulated so that conversion of the ferrous sulphate in solution to ferric sulphate is the main reaction and only small amounts of sulphuric acid are produced as a by-product. The initial temperature of the solution treated is not critical but is preferably between 55° and 65° C. The reaction is exothermic so that there is a temperature rise during the reaction depending on the amount of sulphur dioxide reacting per unit time. When hot pyrite roaster or burner gases are used in the process there is a further rise in temperature due to the sensible heat of the sulphur dioxide containing gases so that the initial solution temperature may be made correspondingly lower.

The following example illustrates the application of the invention as a batch process for conversion of ferrous hydroxide to ferric hydroxide.

*Example II*

An aqueous suspension of ferrous hydroxide containing 10 grams per litre of ferrous iron was introduced into a reactor of the type used in Example I. The only reactant used was atmospheric air which was drawn into the vortex during stirring. After 10 minutes stirring the whole of the ferrous iron content was converted to ferric iron, the solution then having a pH of 7.8.

Manganic hydroxide may be produced by treatment of a manganous hydroxide slurry, using atmospheric air as the oxidising agent, in a manner similar to that described in Example II.

A further example of the application of this invention is the production of benzene hexachloride in which case gaseous chlorine is caused to react with liquid benzene in a manner similar to that described above.

What we claim as new and desire to secure by Letters Patent is:

1. A method of reacting two reactive gases which comprises rotating a body of liquid to create a vortex therein and introducing said gases into said vortex, said body of liquid being rotated at high speed and the gases being beaten into the liquid during rotation of the latter to disperse the gases in a finely divided form and thereby bring them into intimate contact within said body of liquid to effect chemical reaction between said gases.

2. A method as in claim 1 wherein one of said gases is adapted to dissolve in said liquid.

3. A method as in claim 1 wherein said gases are introduced as an admixture.

4. A method as in claim 1 wherein one of said gases is adapted to be oxidized and the other comprises oxygen.

5. A method as in claim 4 wherein said oxidizable gas is sulfur dioxide and said liquid comprises water.

6. A method as in claim 1 wherein at least a part of said liquid reacts with the reaction product of said gases.

7. A method as claimed in claim 1 in which the liquid is maintained at an elevated temperature.

8. A method of reacting oxygen and sulphur dioxide gases which comprises rotating a body of water to create a vortex therein and introducing said oxygen and sulphur dioxide gases into said vortex, said body of water being rotated at high speed and the gases being beaten into the water during rotation of the latter to disperse the gases in a finely divided form and thereby bring them into intimate contact within said body of water to effect chemical reaction between said oxygen and sulphur dioxide gases.

9. A method of reacting oxygen and sulphur dioxide gases with ferrous sulphate which comprises rotating a body of aqueous ferrous sulphate solution to create a vortex therein and introducing said oxygen and sulphur dioxide gases into said vortex, said body of aqueous ferrous sulfate solution being rotated at high speed and the gases being beaten into the solution during rotation of the latter to disperse the gases in a finely divided form and thereby bring them into intimate contact within said solution to effect chemical reaction between said oxygen and sulphur dioxide gases and the ferrous sulphate in said solution.

References Cited in the file of this patent

UNITED STATES PATENTS

| | | |
|---|---|---|
| 2,055,082 | Keyes | Sept. 22, 1936 |
| 2,063,301 | Durdin | Dec. 8, 1936 |
| 2,438,204 | Castner | Mar. 23, 1948 |
| 2,561,256 | Wilson | July 17, 1951 |
| 2,594,675 | Norell | Apr. 29, 1952 |
| 2,698,219 | Martin | Dec. 28, 1954 |
| 2,773,740 | Battarra | Dec. 11, 1956 |
| 2,917,372 | Wallin | Dec. 15, 1959 |